March 24, 1959     C. A. TAYLOR     2,878,775
RESET MECHANISM FOR ACCELEROMETERS Filed March 30, 1956     3 Sheets-Sheet 1

INVENTOR.
CHARLES A. TAYLOR
BY
ATTORNEY

March 24, 1959  C. A. TAYLOR  2,878,775
RESET MECHANISM FOR ACCELEROMETERS
Filed March 30, 1956  3 Sheets-Sheet 2
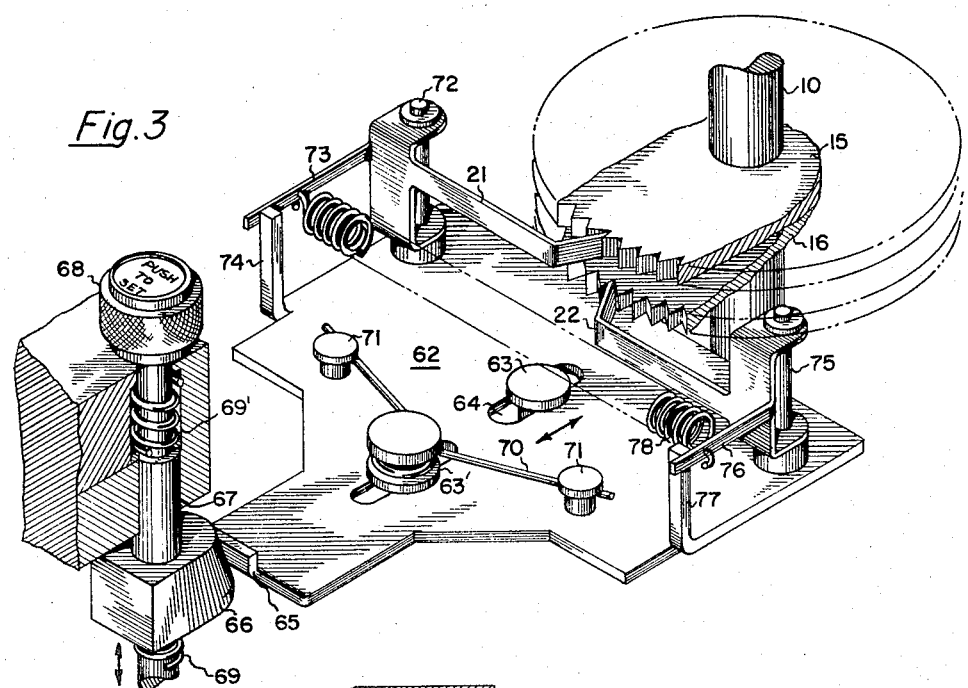
Fig.3
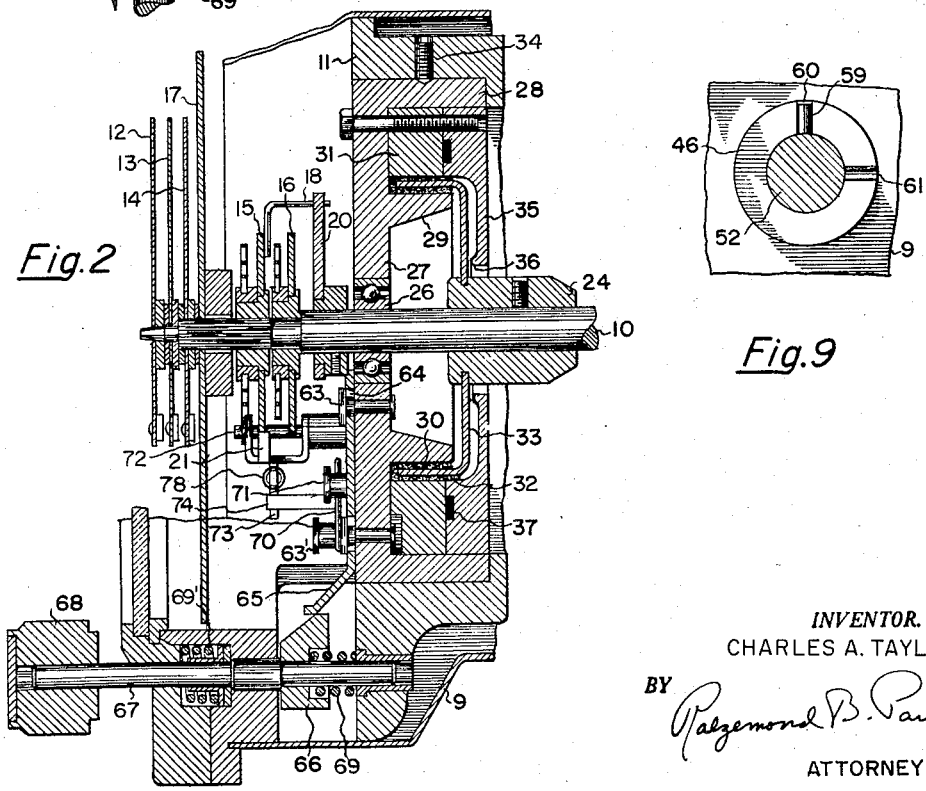
Fig.2
Fig.9
INVENTOR.
CHARLES A. TAYLOR
ATTORNEY March 24, 1959 C. A. TAYLOR 2,878,775
RESET MECHANISM FOR ACCELEROMETERS
Filed March 30, 1956 3 Sheets-Sheet 3

*INVENTOR.*
CHARLES A. TAYLOR
BY
ATTORNEY

United States Patent Office 2,878,775
Patented Mar. 24, 1959

2,878,775
RESET MECHANISM FOR ACCELEROMETERS

Charles A. Taylor, Berwyn, Pa., assignor to Burroughs Corporation, Detroit, Mich., a corporation of Michigan Application March 30, 1956, Serial No. 575,125

5 Claims. (Cl. 116—129)

The present invention relates to indicating instruments for accelerometers and more particularly to the resetting of such instruments to zero following a test operation.

In accelerometers as heretofore constructed it has been found that in use the required sensitiveness and response to deviations of an airplane are hampered by inaccuracies due to unforeseen spurious motions. In an instrument of the critical nature here involved these inaccuracies present problems not heretofore solved.

An object of the present invention is to provide an improved resetting mechanism for accelerometers for restoring an indicating pointer or pointers to zero after the same have been held in a maximum indicating position.

Another object is to provide an improved resetting mechanism for accelerometers having ratchet controlled spring loaded wheels for operating indicating pointers to hold the pointers in maximum acceleration positions wherein the mechanism withdraws the ratchet pawls and restores the pointers to zero position.

Another object is to provide an improved resetting mechanism for accelerometers wherein a slide plate carries a ratchet assembly for detaining indicating pointers in maximum acceleration positions and has a manual means for shifting the plate to release the assembly and restore the pointers to zero; and to provide other improvements as will hereinafter appear.

Various other object, advantages and meritorious features of the invention will become more apparent from the following specification, appended claims and accompanying drawings wherein:

Fig. 2 is a sectional view on line 2—2 of Fig. 1;

Fig. 3 is an enlarged detail perspective view of the reset mechanism;

Fig. 9 is a sectional view on line 9—9 of Fig. 1.

Figure 1:
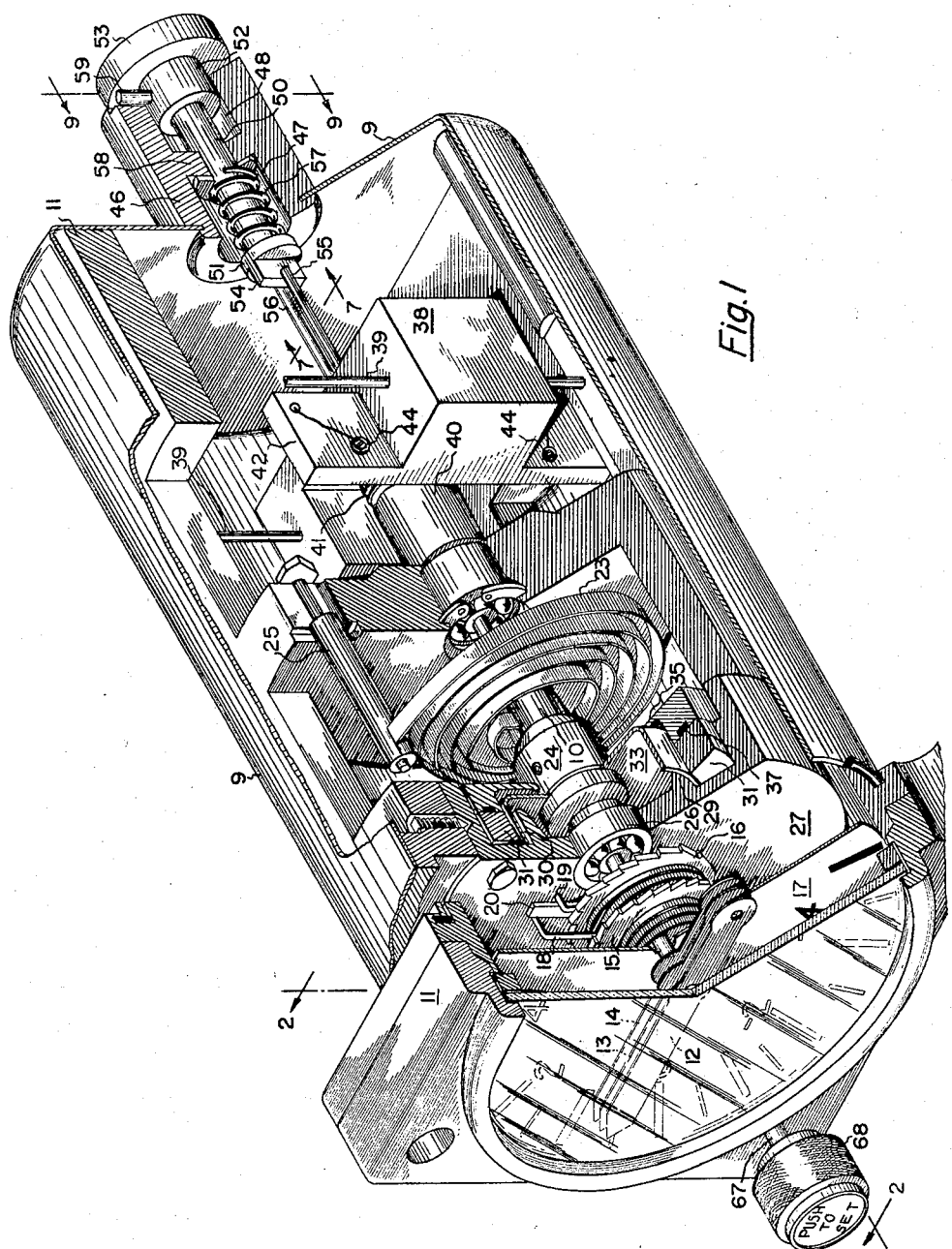
Fig. 1 is a perspective view, in section, of an accelerometer embodying one form of the present invention.

Referring to the drawings and particularly Fig. 1, an embodiment of the invention is shown as an accelerator indicating and dial system wherein a main or indicator shaft 10 is journalled in a frame 11, and carries on one end a pointer assembly including an instantaneous indicating pointer 12 keyed to the shaft and two freely mounted maximum indicating pointers 13 and 14 respectively coupled to two spring loaded ratchet wheels 15 and 16 for joint turning movement through the medium of separate bushings concentrically mounted upon the shaft 10. The frame 11 is housed in a casing 9 for dust proof protection. The three pointers are arranged to sweep the face of a units of gravity dial 17 so that the pointer 12 rotating with the shaft 10 provides instantaneous readings in units of gravity in either plus or minus directions during tests while the pointers 13 and 14 provide stable indications respectively of the plus maximum and negative maximum accelerations during any maneuver of an aircraft in which the instrument is mounted. Also it will be understood that the two ratchet wheels 15 and 16 rotate in opposite directions in accordance with motion transmitted by an arm 20 fixed to the shaft 10 as shown in Fig. 2 and projecting radially therefrom to a position between pins 18 and 19, carried respectively by the juxtaposed faces of the wheels 15 and 16 and bent to overlap the arm. Two pawls 21 and 22 (see Fig. 3) respectively engage the ratchet wheels 15 and 16, as a means for holding each wheel at its maximum plus or minus rotation point for a reading of the associated pointer after some time interval.

For creating a torque upon the shaft 10 in opposition to the torque produced by the acceleration of a gravity responsive mass, a spiral coiled torsion spring 23 is provided having an inner end keyed to the indicator shaft 10 rearwardly of hub 24, and has its outer end held by a stud 25 fastened to the frame 11. The stud 25 permits adjustment of the spring rate, affects linearity and spring positioning. This spring 23 provides a restraining torque to the acceleration applied to the mass. The design of the spring 23 is chosen to allow it to remain linear throughout the deflection range.

In order to minimize the effect of developed vibrations and secure the required frequency response of the instrument, it is preferable to provide a damping mechanism, which in this instance, is located adjacent to the ratchet mechanism and provides a bearing 26 for an end of the shaft 10. As shown in Figs. 1 and 2, this damping mechanism comprises a circular plate 27 having an outer annular flange 28 and an inner concentric flange 29, the latter forming one side of a circumferential groove 30 of which the opposite side is formed by a ring 31. This groove 30 provides a receptacle for a damping fluid 32 of relatively heavy viscosity in which the rim of a cup 33 rides as an attached part of the hub 24. The plate 27 journals the bearing 26 and is fixed to the frame 11 by a set screw 34.

For preventing escape of the fluid 32 the cup 33 is housed in an annular cover 35, bolted or otherwise made fast to the plate 27 and the ring 31, and formed with a laterally disposed circumferential lip 36 which is juxtaposed to the rear face of the cup 33 but out of contact therewith. Thus any displaced fluid 32 is trapped and cannot escape. Also a gasket 37 is interposed between the cover 35 and the ring 31 to prevent leakage along the joint. It should be observed that the groove 30 could be machined into a thickened face of the plate 27 to serve to the same purpose but for practical assembly reasons the supplemental ring construction is preferred. Also it will be noted that this damping mechanism is a complete unit mounted in and carried by the frame 11, for ease of assembly, repair or replacement. The damping forces are a function of the velocity and area of the damping cup, viscosity of the damping fluid, and the clearance between the moving cup and stationary members of the unit.

Figure 6:
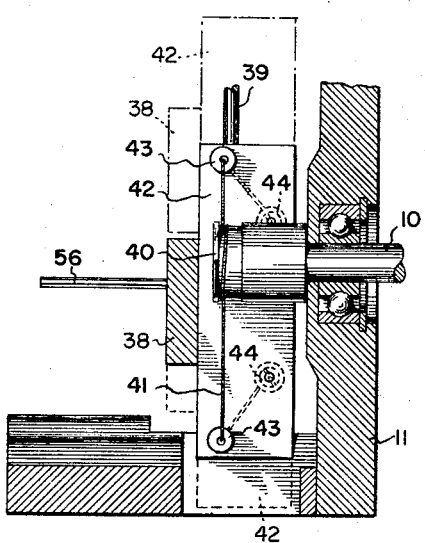
Fig. 6 is a sectional view on line 6—6 of Fig. 4.

A feature of the apparatus is the provision for translating the forces acting upon the airplane, under accelerating conditions, into measurements which are indicated by the pointers 13 and 14. For this purpose a movably mounted gravity responsive mass 38 is provided adjacent the rear end of the unit, and arranged for sliding movement upon two guide rods 39 which have ends respectively attached to the frame 11 and provide movement of the mass of perpendicular or cross wise to the axis of shaft 10. Preferably the mass 38 is a U-shaped block straddling a sheave 40 keyed to the rear end of shaft 10 for pointer control purposes. A cord 41, having a convolution about the sheave 40, transmits movement of the mass to the shaft 10. The cord 41 is maintained under tension by having its ends fastened respectively to opposite ends of a supplemental weight in the form of a plate 42 forming an integral part of the mass 38 as shown or fixed to the inner face of one of the legs thereof. Preferably the ends of the cord 41 respectively pass through holes 43 provided in the plate 42 and are anchored in stretched condition by attaching screws 44 or the like on the opposite side of the plate. The mass 38 and plate 42 jointly move on the rods 39—39 and this movement is converted into a rotary motion of the shaft 10 by means of the cord and sheave wheel. The extent of movement of the mass and associated parts is shown in dotted outline in Fig. 6. Portions of the supporting frame 11 may be cut away to provide clearance for this movement.

The weight of the plate 42 added to that of the mass 38 makes it possible to locate the straight line portions of the cord 41 in alignment with the center of gravity of the composite mass 38. Since the length of the cord passes through the center of gravity of the mass, the inertia force acting on the mass and the equilibrating force in the cord are linear and no couples between these forces can arise to cause binding between the mass and its guide rods. Hysteresis due to static friction between the mass and the guide rods is thus mitigated.

Figure 7:
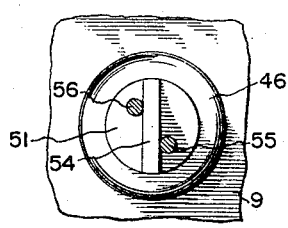
Fig. 7 is a detail view in elevation of the mass locking mechanism taken along line 7—7 of Fig. 1 and showing the mechanism in unlocked position.
Figure 4:
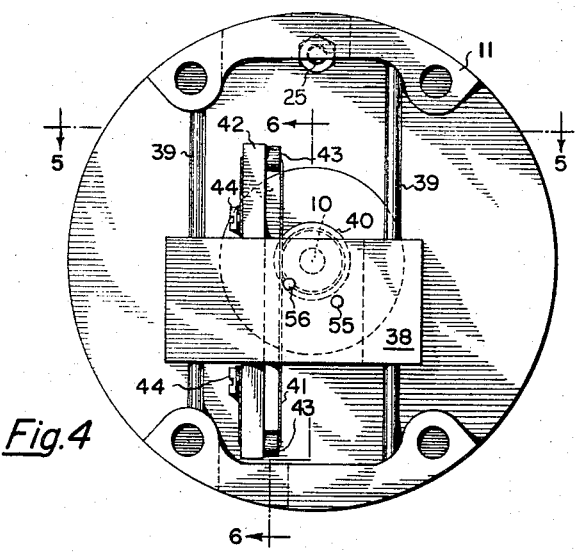
Fig. 4 is an end elevation of a component of the accelerometer showing a slidable mass responsive to acceleration.
Figure 8:
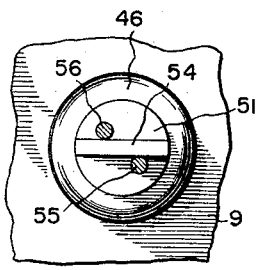
Fig. 8 is a view like Fig. 7 showing the parts in locked position.
Figure 5:
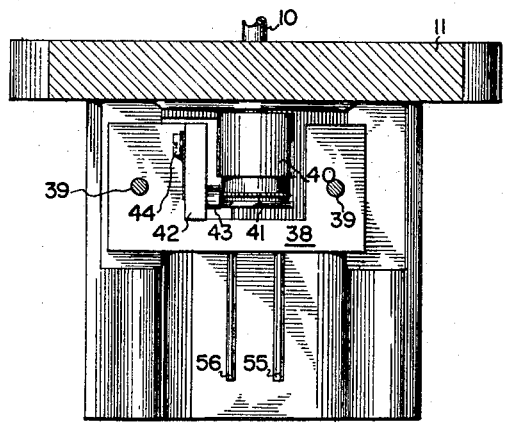
Fig. 5 is a sectional view on line 5—5 of Fig. 4.

In order to protect the accelerometer against damage during shipment, storage and otherwise, a locking device, shown in Figs. 1, 7 and 8, is provided, comprising a housing 46 attached to the rear end wall of the casing 9 and having two aligned spaced apart chambers 47 and 48, opening out at opposite ends of the housing 46, to respectively receive parts of the lock device. This device comprising a turnable, endwise slidable spring loaded plunger 50 journalled in the housing 46 and having a lock member 51 attached at one end in juxtaposed relation to the mass 38, and a head 52 attached to the other end, such head 52 being part of a pull-turn knob 53 which is conveniently located for manual operation.

The lock member 51 is formed with a projecting transverse lug 54, on its face opposite to the mass, to be positioned between two laterally spaced and axially offset locking pins 55 and 56, which project from the rear side of the mass 38. The lug 54 is in the form of a strip having a thickness less than the spacing of the pins so that in one position of the lug (Fig. 7) the pins are free to rise or fall and in a second position (Fig. 8) to lie in the path of movement of the pins and prevent movement of the mass. As a part of the locking mechanism a compression spring 57 encircles the part of the plunger 50 in the chamber 47 and is compressed between the lock member 51 and an internal rib 58 of the housing 46.

For locking the lug 54 in either selected position, the head 52 has a radially projecting detent pin 59 arranged to seat in either of two limit slots 60 and 61, best shown in Fig. 9, which are cut in the outer end of the housing according to the locking or unlocked relation of the pins. In both positions the lug 54 is releasably locked against turning movement from its selected position. This selection positioning is accomplished by pulling the knob 53 outwardly to bring the detent pin 59 out of one slot and then turning the knob, through the required angle, to enter the second slot at which time the knob is released to the action of the biasing spring 57. For example, to lock the mass the knob is turned to bring the pin 59 into register with the slot which corresponds to the transverse position of the lug 54, whereupon release of the knob brings the lug into the path of the two mass pins 55 and 56 to lock the mass against sliding movement. The lug 54 is restored to unlocked position by again retracting the plunger 50, and turning the knob to bring the detent into register with the slot denoting the unlocked position whereupon release of the plunger locates the lug 54 parallel to the travel of the pins 55 and 56. In both positions the lug 54 is locked against movement.

The invention relates to the provision for resetting the auxiliary pointers 13 and 14, which indicate the positive and negative acceleration during any given maneuver, after such maneuver is completed. For this resetting purpose, after an accelerating movement, the mechanism of Fig. 3 is provided wherein the pawls 21 and 22 are supported from the same side face of a position control plate or member 62 which is slidably supported by studs 63—63′, the latter being double headed, which project respectively from an attached part of the frame 11 and ride in their respective slots 64 in the control plate 62. A tongue or cam arm 65, as a part of the plate 62, projects at an incline into the path of movement of a tapered cone-like cam 66 which functions when moved to "set position" to slidably engage the inclined tongue 65 and shift and hold the plate 62 in pawl engaging position. The cam 66 is fixed to a rod 67 suitably supported for axial movement and terminating in an external reset knob 68. A spring 69 is coiled about the rod 67 and is compressed between the cam 66 and a fixed part to bias and maintain the cam 66 in plate raised position with the pawls 21 and 22 respectively riding against the ratchets of the wheels 15 and 16. By manually pushing the knob 68 against the biasing spring 69 the cam 66 is moved away from the inclined arm 65 whereby the slide plate 62 drops to "reset position" with the aid of the biasing action of a torsion spring 70. The spring 70 has a convolution wrapped around the double headed stud 63′ and has its ends biased respectively against two laterally spaced upstanding lugs 71 to exert a withdrawing force upon the plate 62. The shifting of the plate 62 withdraws the pawls 21 and 22 to release the ratchet wheels 15 and 16 to the action of the respective wheel loading springs. The ratchet wheels then return the respective pointers to zero. Preferably a spring loaded seal 69′ encircles the rod 67 to keep out moisture.

As shown the plus pawl 21 forms one leg of a bell crank pivoted to swing about a pin 72 which rises from the plate 62 parallel to the axis of the wheel 15, while the other leg 73 of the bell crank is arranged to abut a stop 74, here shown as a part of the plate 62. As so mounted the radial length of the pawl 21 is such as to engage the teeth of its wheel 15 at a point lying in a radial plane passing through the wheel axis.

Similarly the minus pawl 22 forms one leg of a bell crank pivoted to swing about a pin 75 which also rises from the plate 62 parallel to the axis of the wheel 16, while the other leg 76 of the bell crank is arranged to abut a stop 77, here shown as a part of the plate 62. As so mounted the radial length of the pawl 22, like that of the pawl 21, is such as to engage the teeth of its wheel 16 in the same radial plane as that described for the pawl 21. It should also be noted that the two bell cranks as mounted on the pivots 72 and 75 lie in the planes of their respective ratchet wheels 15 and 16, that is, laterally spaced apart from one another a distance corresponding to the spacing of the two wheels.

It is important to note that the points of the two pawls 21 and 22 thus lie in a common radial plane which includes the axis of shaft 10 about which the wheels 15 and 16 rotate. Engagement and release of the pawls for resetting operations is effected by linear motion of plate 62 which is their common mounting and which bodily moves the pawls into and out of engagement with their respective wheels. This radial entry of the pawls into the teeth of the ratchet wheels 15, 16, is important in eliminating disturbance to the wheels in that the forces applied by the pawls to the wheels pass through the axis about which the wheels rotate and consequently cannot exert a force to turn the wheels about their axis. It should further be evident that rotation of the pawls 21, 22 about their axes 72, 75, is only that incident to their respective ratchet actions upon the application of turning forces to the wheels when the latter are rotated by movement of the weight 38.

The two pawls 21 and 22 are biased to wheel engaging positions by a coil spring 78 stretched between the legs 73 and 76 and tensioned to hold the latter against their respective limit stops 74 and 77. Thus the stop 74 limits the turning of the pawl 21 to its wheel engaging position, and the stop 77 limits the turning of the pawl 22 to its wheel engaging position, so that no unnecessary drag is applied to the movement of the wheels.

For operation the accelerometer assembly is initially calibrated by tensioning the spiral spring 23 to locate the mass 38 in a neutral position and preferably to set the pointers in a one $g$ position. When the instrument is mounted in an aircraft the mass guide rods 39 are arranged normal to the plane of the aircraft wings. Now when the plane goes into a dive the mass 38 is acted upon by positive accelerations and the cord 41 causes the sheave 40 to rotate the shaft 10 in a clockwise direction to give positive readings in units of gravity by the indicating pointer 12 and the plus pointer 13 on the dial 17. When the plane is pulled out of the dive the pointer 12 follows the counter-clockwise rotation of the shaft 10 but the pointer 13 remains in its maximum turned position because the ratchet wheel 15 is locked against return movement by its pawl 21. During the climb of the plane from the completed dive the mass 38 moves along the guide rods 39 in the opposite direction causing the shaft 10 to turn in a counter-clockwise direction whereby the indicating pointer 12 turns counter-clockwise for negative indication and the minus pointer 14 follows in the same direction to be finally latched in the position indicating the maximum negative acceleration.

At the end of the acceleration test, the instrument is reset to zero for another test by operating the reset mechanism. In so resetting the rod 67 is pushed inwardly by the knob 68 on the front of the unit to withdraw the cam 66 from its supporting position under the arm 65, thereby releasing the plate 62 to the pull of the torsion spring 70 and so withdrawing the pawls 21 and 22 from engagement with the respective ratchet wheels 15 and 16, the spring loading of which resets the pointers 13 and 14 to zero.

What is claimed is:

1. A resetting mechanism for accelerometers having mounted thereon two pointers rotatable in opposite directions with respect to each other from an initial setting and coupled to a suspended mass to indicate the positive and negative forces which act upon said mass during acceleration thereof and with each pointer having an associated ratchet wheel jointly rotatable therewith in response to movement of said mass, a position control member slidably mounted on said mechanism for movement between advance and retracted positions relative to each ratchet wheel in directions parallel to a radius of the latter, a pawl for each ratchet wheel mounted on said control member, each pawl engaging its associated wheel in arresting contact when said control member is moved to its advance position whereby the relative movement between said pawl and wheel results in a dead center contact without introducing angular rotation therebetween, and each pawl being free of engagement with its respective ratchet wheel when said control member is moved to its retracted position to thereby permit restoration of said ratchet wheels to said initial setting.

2. A resetting mechanism for an accelerometer as set forth in claim 1 wherein the position control member is a plate slidable in a plane parallel to the respective plane of each associated ratchet wheel.

3. A resetting mechanism for an accelerometer as set forth in claim 1 including spring means to move said control member to its retracted position.

4. A resetting mechanism for an accelerometer as set forth in claim 3 including manually operable cam means which engage said control member to move the latter to its advance position in opposition to said spring means.

5. A resetting mechanism for accelerometers of the type having mounted thereon, two pointers rotatable from an initial position in opposite directions with respect to each other, said directions corresponding to positive and negative motions of a suspended mass subject to acceleration, two ratchet wheels, one for each pointer, disposed in parallel planes and each jointly rotatable coaxially respectively with a corresponding pointer, a control plate slidably mounted on said mechanism for movement between advance and retracted positions in a plane parallel to the planes of said ratchet wheels, a pawl for each ratchet wheel rotatably mounted on said control plate, each pawl engaging its associated ratchet wheel along a radial line and in arresting contact therewith when said control member is in its advance position, each pawl being free of engagement with its respective wheel when said control member is in its retracted position to thereby permit restoration of said ratchet wheels to said initial setting, a coil spring connected at one end thereof to one pawl and at its other end to the other pawl to bias said pawls for opposite rotational movements into ratchet wheel arresting positions, means on said control plate to so limit the rotational movements of said pawls, spring means to move said control plate to its retracted position, and cam means to move said control plate in opposition to said spring means to its advance position.

References Cited in the file of this patent

UNITED STATES PATENTS

| | | |
|---|---|---|
| 989,088 | Volkmar | Apr. 11, 1911 |
| 2,433,541 | Bevins | Dec. 30, 1947 |

FOREIGN PATENTS

| | | |
|---|---|---|
| 240,636 | Switzerland | May 1, 1946 |